US007539774B2

United States Patent
Stahura

(10) Patent No.: US 7,539,774 B2
(45) Date of Patent: May 26, 2009

(54) METHOD FOR DOMAIN NAME REGISTRATION AND A CORRESPONDING APPARATUS

(75) Inventor: Paul Stahura, Sammamish, WA (US)

(73) Assignee: Demand Media, Inc., Santa Monica, CA (US)

( * ) Notice: Subject to any disclaimer, the term of this patent is extended or adjusted under 35 U.S.C. 154(b) by 719 days.

(21) Appl. No.: 11/295,122

(22) Filed: Dec. 5, 2005

(65) Prior Publication Data

US 2007/0130284 A1 Jun. 7, 2007

(51) Int. Cl.
*G06F 15/16* (2006.01)
(52) U.S. Cl. .......................... 709/245; 709/222; 709/228
(58) Field of Classification Search ................. 709/222, 709/228, 245
See application file for complete search history.

(56) References Cited

U.S. PATENT DOCUMENTS 7,450,517 B2 * 11/2008 Cho ........................... 370/238

* cited by examiner

*Primary Examiner*—Michael Won
(74) *Attorney, Agent, or Firm*—Greenberg Traurig, LLP

(57) ABSTRACT

The disclosed method and apparatus makes possible the registration of domain names in one or more registration state-types, each registration state-type being associated with a set of functional rules or parameters. Certain of the registration state-types are allowed to have priority over other of the registration state-types, meaning that a domain name registered in a low priority registration state-type may be superseded or overwritten by an intervening registration to the same or a different registrant who requests a higher priority registration. Interplay of the registration state-types and parameters provides for a broad range of registration services and flexibility in the means by which consideration is obtained in exchange for registration services.

5 Claims, 3 Drawing Sheets

METHOD FOR DOMAIN NAME REGISTRATION AND A CORRESPONDING APPARATUS

TECHNICAL FIELD

The described technology relates generally to the registration of domain names in a domain name system.

BACKGROUND

The Internet provides a domain name system ("DNS") that maps domain names to other domain names, other objects, name servers, and, Internet Protocol addresses. Internet Protocol addresses shall hereinafter be referred to as "IP addresses," which reference should also be understood in this disclosure to include equivalent private computer addresses. Domain names are a convenient alternative to IP addresses, as most humans have difficulty remembering and faithfully reproducing IP addresses like 209.19.43.100. A user who wants to view a web page associated with a domain name may enter the domain name (e.g., "acme.com") in the address line of a browser. Following an iterative process described in paragraph 0002 of U.S. application number 20030009592, which paragraph is incorporated into this application by this reference, the domain name is mapped to an IP address.

Registries are the entities which operate the top-level domain names, or "TLDs." For example, Verisign, Inc., presently operates the .com and net registries. Registries may, though typically do not, interact directly with registrants who wish to register domain names. Typically, registrants register domain names through intermediaries, called registrars. Registrars may be accredited by the Internet Corporation for Assigned Names and Numbers, or "ICANN." ICANN currently also controls the addition of new TLDs to the root domain name server and may enter into contracts with the registry operators which provide domain name registration services in the TLDs. The registries maintain databases of the domain names that are currently registered within each registries' TLD. When a prospective registrant submits a request to a registrar to register a domain name, the registrar submits the request to the relevant registry. Typically, the registry validates the request, timestamps the request, checks the request against the database of then-currently registered domain names, and may perform other operations. If the domain name was not then-currently registered, the registry allows the domain name to be registered by the first registrar to submit the request. Alternatively to the first-come first-served domain name registration model, other methods are sometimes employed, such as auction of domain names, "sunrise periods" (during which trademark claimants are offered preferential registration rights), and rights-of-first refusal (such as Verisign's proposed but not yet implemented "Wait List Service"). The registry returns the result(s) to the registrar(s) who requested the domain name registration service. If the domain name has previously been registered (if it is already listed in the database of then-currently registered domain names), the registry returns a code which indicates that the requested domain name registration is not available.

Practitioners skilled in the art would appreciate that, while this disclosure is primarily addressed to registries, registrars, and the public or quasi-public TLDs administered by ICANN and other bodies, that the disclosed invention can also be applied to analogous applications in the field of domain name and IP address systems, such as a privately managed domain name systems and privately managed computer networks. In this case, the "registry" is any person or entity which has authoritative control over the top level of a hierarchical domain or IP address or other computer address system; and in which case a "registrar" is a delegate of the "registry" with authoritative control over one or more levels of sub-domains or sub-addresses; and in which case a "registrant" is a delegate of the "registrar" with authoritative control over one or more levels of sub-domains or sub-addresses below the level of the "registrar."

Domain names, once registered, can have various statuses, such as "registrar lock," "registrar hold," "pending delete," and other statuses. These statuses may be viewed in the WHOIS output for a domain name (either as supplied by a registry or a registrar). In this disclosure, these statuses are referred to as parameters of a domain name, while the question of whether a character string is registered or not as a domain name is referred to in this disclosure as a domain name's "registration state" or "registration states." Existing registries offer one binary registration state for character strings which are allowed in the TLD: a character string is either registered, in which case it is a domain name in the TLD, or it is not, in which case the character string is available to be registered (if a character string is not allowed in the TLD, then it can be neither registered nor available).

Domain name registration services incur real costs which are expended to maintain the operation of the registries, ICANN, and the registrars. These costs are typically recovered through fees. In the context of domain names, the registries typically charge fees of the registrars, which fees are passed along through various business models to the registrants. It should be noted that registrars and registries can also be registrants; as a consequence, in this disclosure, references to registrants shall be understood to include registrars and registries, when acting to register domain names on their own behalf, unless specifically noted otherwise. References to registrars or registries, however, shall not be understood to include registrants, except as noted otherwise.

The fees charged by the registries and registrars have a very real impact on the domain names which become registered, because not all domain names have a value equal to or greater than the minimum fee for which a domain name may be acquired. For example, the domain name <microsoft.com> is worth tens or even hundreds of millions of dollars and, hence, is assured registration. The domain name <ad2a9d3ocs.com> may have a value, but it is probably less than the current minimum one year registration fee for this domain name in this TLD, which, on Jun. 17, 2005, is at least $6.25, which does not include a markup for the registrar (Verisign, the operator of the .com TLD, charges a registration fee of $6.00, and ICANN charges a fee of $0.25). As a consequence, <ad2a9d3ocs.com> is unlikely to become a registered domain name, notwithstanding that it may have some value.

It is desirable to create a domain name registration system which would permit registration of domain names which may have a variable monetary value, including a low monetary value, which can allow market forces to control the allocation and assignment of domain names, which apportions risk associated with extending credit to pay for the cost of registration services, and which provides greater flexibility to recover of the costs of providing registration services. The disclosed invention accomplishes these objectives by providing more than one registration state for allowed character strings and IP addresses. To distinguish this use of "registration state" from the common usage of this term, this disclosure will use the term "registration state-type" to indicate that the domain name's registry offers potentially more than one registration state.

Certain of the registration state-types provided by the invention allow that a registered domain name may be reassigned to a second registrant without any act on the part of the previous registrant to reassign or transfer the domain name to the second registrant. Certain of the registration state-types provided by the invention allow that the registrant (or the authorized representative of the registrant) of a registered domain name may control all of the domain name's parameters, such as specification of domain name servers, while other of the registration state-types provide that certain of the parameters may not be controlled by the registrant. The interplay of the various registration state-types and parameters makes it possible for domain names to be registered regardless of the monetary value of the domain names, while providing means through which risk can be apportioned and through which registries and registrars can recover the costs of providing registration services.

DETAILED DESCRIPTION

Figure 1:
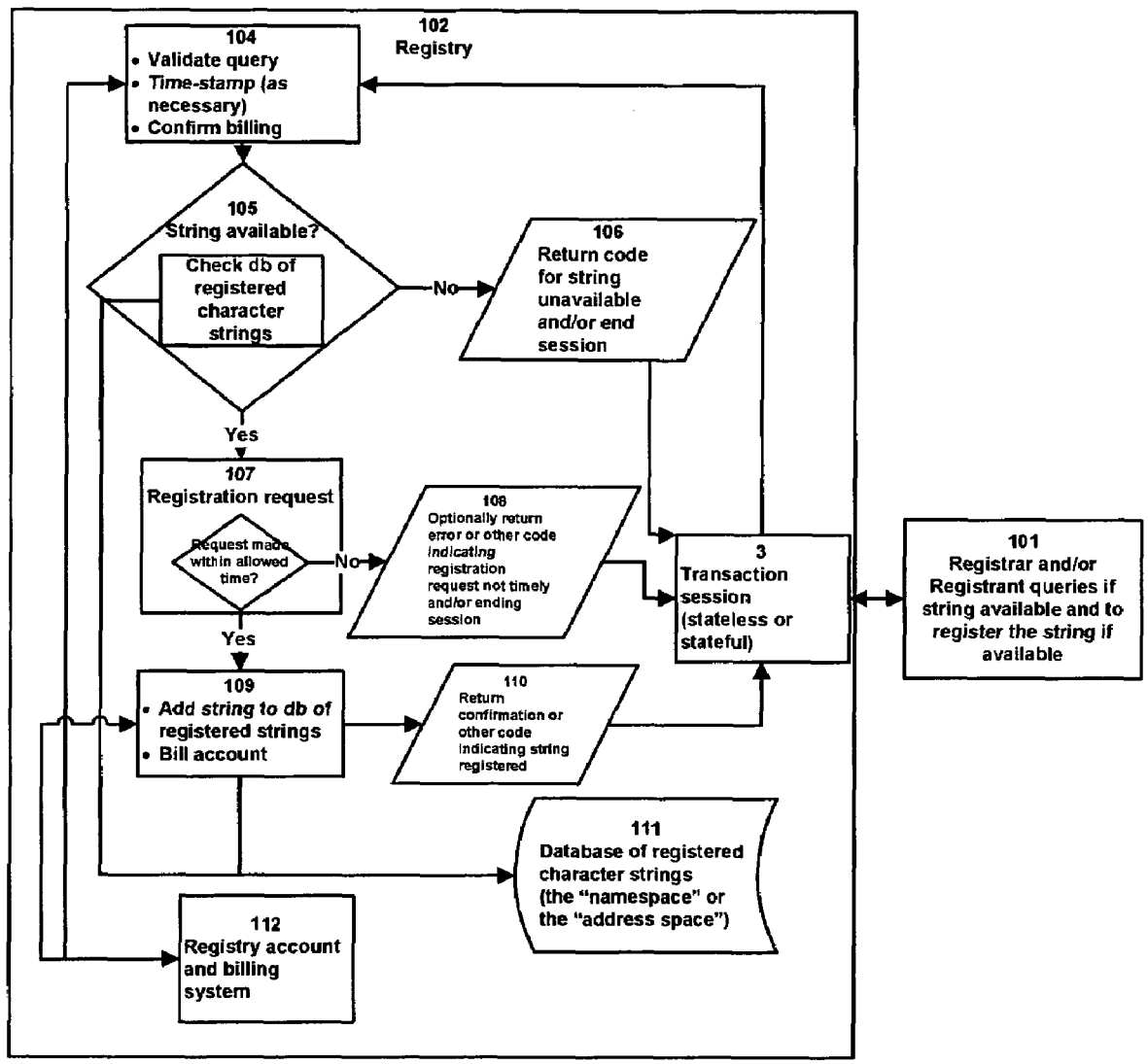
FIG. 1 is a process diagram of a prior art registry system, depicting the process of inquiring if a string is available and to register it as a domain name registration if the string is available. The depiction applies generally to a stateful transaction session; certain steps may be omitted and replaced by other equivalent additional steps, not shown, to implement a stateless transaction session.
Figure 2:
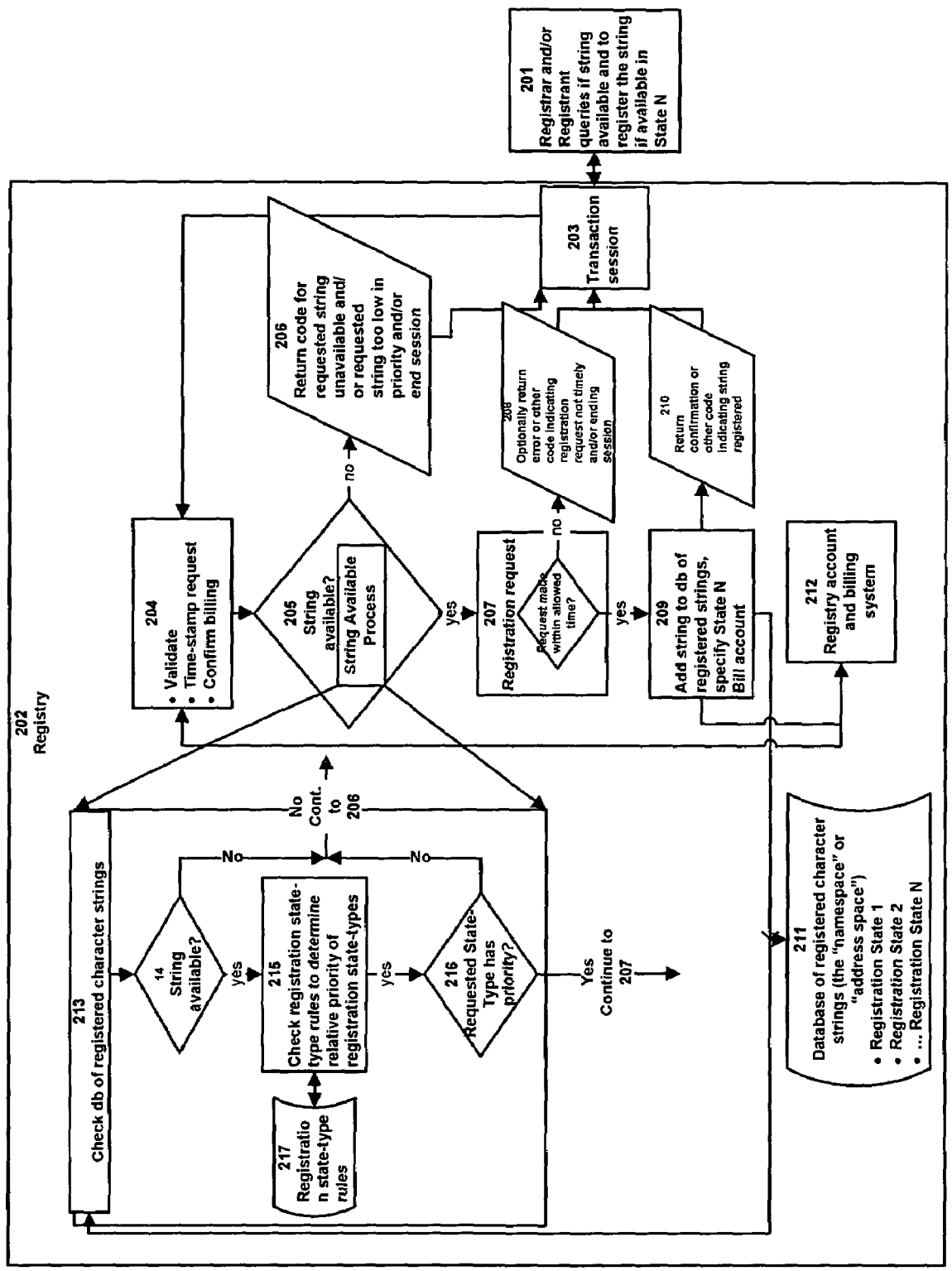
FIG. 2 is a process diagram of the disclosed registry system, depicting the disclosed invented process of inquiring if a string is available in registration state-type N and to register it as a domain name registration in state-type N if it is available. The depiction applies generally to a stateful transaction session; certain steps may be omitted and replaced by other equivalent additional steps, not shown, to implement a stateless transaction session.
Figure 3:
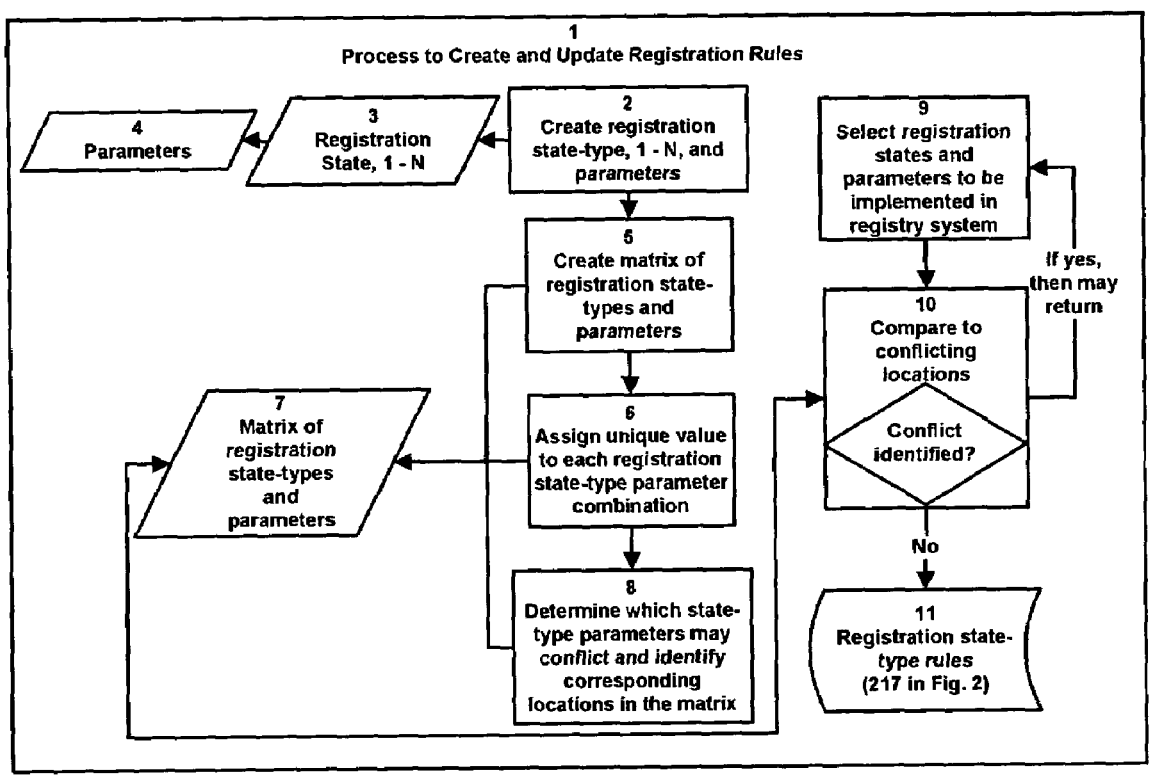
FIG. 3 is a process diagram detailing a sub-system of the disclosed registry system, which sub-system is used to create and update the registry system's registration rules and to avoid internally inconsistent combinations of registration state-types and parameters.

Disclosed is a method of registering domain names and an apparatus therefore. The disclosure requires means for conducting a transaction session between a registry and a registrar and/or registrant over the Internet or another computer network. The means for conducting such a transaction session are well known to practitioners in the art and include the Extensible Provisioning Protocol ("EPP") and the Registry Registrar Protocol ("RRP") and other application programming interfaces (or "API's") used by various of the registry operators, in combination with various communication or transport protocols. A practitioner skilled in the art would recognize the many means which are available or conceivable or yet to be developed to perform the function of conducting a transaction session between a registry and a registrant, including the communication by a registry with its own databases, as in the case of a registry acting as a registrar. The disclosure also requires means to store and access the result of the resulting transaction session(s) in a digital database. A practitioner skilled in the art would recognize the many means which are available or conceivable or yet to be developed to perform the function of storing and accessing the result of transaction session(s) which occur between a registry and a registrar and/or a registrant.

In the disclosed invention, a registry offers two or more registration state-types for domain names registered in the registry's TLD. In a first disclosed embodiment, a registry offers at least three registration state-types, which registration state-types, for convenience, shall be referred to herein as State-Type One, State-Type Two, State-Type Three, through State-Type n. A practitioner skilled in the art would appreciate that there exist many means through which the function of specifying different registration states-types may be accomplished between a registrar and a registry and/or within a registry. For example, in an embodiment, ICANN and/or the participating registries could issue different credentials or certificates to registrars, each credential or certificate being assigned a label or each credential or certificate otherwise being placed in a category which indicates that "create" or equivalent commands in a transaction session between the registry and such registrars' credential or certificate relate to creating a domain name in a specific registration state-type. In another embodiment, registries utilizing the invention would add additional commands to such registries' APIs, modify existing commands (such as adding or modifying parameters to or of existing commands), or use multiple sequential commands from such registries' existing API commands to distinguish commands to register or check domain name registrations in the different registration states-types, or otherwise directed to the different registration states-types. There is no preferred embodiment with respect to the means through which the function of specifying different registration states-types may be accomplished between a registrar and a registry or within a registry.

In this first disclosed embodiment, registration of a character string as a domain name in State-Type One results in the domain name being unavailable to be registered by another registrant so long as the domain name remains continuously registered or assigned to the first registrant. Practitioners in the art will appreciate that there are various ways the registration state-type can be communicated outside of the registry, including, without limitation, in response to a "check" query or the equivalent in a transaction session between any party and the registry or a registrar or through display of the WHOIS output for a domain name, or equivalent. In this first disclosed embodiment, State-Type One allows the registrant to control all parameters which are available to the domain name, such as and without limitation the DNS settings for a domain name, the WHOIS contact information for the domain name, whether it is on "registrar lock" and similar. Practitioners in the art will appreciate that State-Type One in this first disclosed embodiment is similar to the registration services offered to domain names in most TLDs, as such services are provided as of the filing date of this disclosure. Unlike such domain name registration services, however, State-Type One interacts with or has the potential to interact with the other registration state-types described further below.

In this first disclosed embodiment, registration of a character string as a domain name in State-Type Two provides that the registered domain name may be deleted from the registry's database of registered domain names and may then be registered by the same or a different registrant (which request may be communicated via the same or a different registrar or directly by the registry interacting with itself) upon the occurrence of a request to register the identical character string under State-Type One. Practitioners skilled in the art would appreciate that the previous registration of the domain name in State-Type Two need not be deleted from the registry's database prior to registration under State-Type One; means need only be employed to achieve the function of updating the records which embody the domain name registration in the registry's database to reflect the change in registration state-type and to reflect the new parameters specified by the subsequent registrant; for example, only the registrar of record and the registration state-type identifier may be changed. In this first disclosed embodiment, the domain name registered in State-Type Two allows the registrant to control all parameters which are available to the domain name, such as and without limitation the DNS settings for the domain name, the WHOIS contact information for the domain name, whether it is on "registrar lock," and similar.

In this first disclosed embodiment, registration of a character string as a domain name in State-Type Three provides that the domain name registered in State-Type Three may be deleted from the registry's database of registered domain names and may then be registered by the same or a different registrant (which request may be communicated via the same or a different registrar or directly by the registry interacting with itself), upon the occurrence of a request to register the identical character string under State-Type One and/or under State-Type Two. Practitioners skilled in the art would appreciate that the previous registration of the domain name in State-Type Three need not be deleted from the registry's database prior to registration under State-Type One and/or State-Type Two; means need only be employed to achieve the function of updating the records which embody the domain name registration in the registry's database to reflect the change in registration state-type and to reflect the new parameters specified by the subsequent registrant. In this first disclosed embodiment, the domain name registered in State-Type Three limits the parameters which the registrant is allowed to control with respect to the domain name in the TLD. In an alternative embodiment of this first disclosed embodiment, the registrant of a domain name is allowed to control all the parameters for the domain name except the DNS settings for the domain name, which are controlled, instead, by the registry, by a registrar, or by a third party; for example, the name servers for the registered domain name may be fixed by the registry (or another party) and may not be set or changed by the registrar or registrant. Means to control the DNS settings for the domain name include having the registry provide the mapping to the specified name servers in response to domain name resolutions request, without further utilization of the iterative process described in paragraph 0002 of U.S. application number 20030009592 past the registry level. Alternatively, parties delegated authority below the level of the registry may be contractually required to supply the desired mapping and/or may be required to employ specific technology in such parties' name server systems, which technology would supply the desired mapping. Alternatively, if the name servers for domain names in a TLD with registration status of State-Type Three are sufficiently well known and stable, then, instead of using the domain name resolution process described in paragraph 0002 of U.S. application number 20030009592, a party seeking the IP address of a domain name could send a "check" command or similar to the registry; if the response indicates that the domain is registered with a registration status of State-Type Three, then the party making the request would know the IP address of the domain name without further inquiry. In an alternative embodiment, the response indicating the registration status of the domain name may include the IP address in the response. In another alternative embodiment of this first disclosed embodiment, the registrant of a domain name in State-Type Three is allowed to control all the parameters for the domain name. In an alternative embodiment, the domain name registered in State-Type Three may route to a destination specified by the registrant, but via an intermediary destination not specified by the registrant.

In the first disclosed embodiment, the registry may offer additional registration state-types beyond three, which additional registration state-type(s) provide the registrant(s) with control over different of the domain name parameters and which additional registration state-type(s) may be superseded, overwritten, or replaced by one or more of the registration state-type(s) or which may co-exist with one or more of the other registration state-type(s).

In a second embodiment, a registry offers two registration state-types, the first of which provides exclusive use of the domain name and complete control of the domain name parameters to the registrant; the second of which registration state-types being exclusive so long as the character string is not registered by the same or a different registrant in the first registration state-type and the second of which registration state-types providing control over less than all of the domain name parameters.

In a third embodiment, the first or second embodiments include means, similar to a right of first refusal, to allow an existing registrant to change the registration state-type of a domain name in response to a request by a potential registrant (which generally would be a different potential registrant, but may potentially including the existing registrant) to register a character string in a registration state-type which is capable of superseding, overwriting, or co-existing with the then-current registration state-type.

Many registries provide a grace period during which domain name registration services provided by the registry can be canceled by the registrar or registrant. If the service cancellation occurs within the grace period, referred to hereinafter as the "registration-cancellation grace period," the registry either does not charge fees for the cancelled services or the registry provides a full or partial credit or refund for the cancelled services. These registration-cancellation grace periods are provided, for example, to allow a period for registrars to discover and reverse fraudulent use of credit cards and other payment defaults. In an alternative embodiment of the preceding disclosed embodiments, the registration-cancellation grace period for various of the registration state-types is made to be one of the following: i) some unit of time, for example, one day, less than the term of the domain name registration, ii) zero, or iii) a variable number of time units, the number of time units depending, for example, on other acts such as receipt of a payment or surrender or delegation of control over a domain name parameter, such as the DNS settings.

In an alternative embodiment of all of the preceding disclosed embodiments, the various registration state-types may co-exist, though only one of which would control certain of the domain name parameters at any given time.

In a preferred embodiment, a registry offers three registration state-types for domain names in the TLD, State-Type P One, State-Type P Two, and State-Type P Three. In this preferred embodiment, registration of a character string as a domain name in State-Type P One results in the domain name being unavailable to be registered by another registrant so long as the domain name remains continuously registered in the TLD. In this preferred embodiment, State-Type P One allows the registrant to control all parameters which are available to the domain name in the TLD, such as without limitation the DNS settings for the domain name, the WHOIS contact information for the domain name, whether it is on "registrar lock," and similar. In this preferred embodiment, the registry charges a fee of X for a registration period of L time units for this service and the registration-cancellation grace period is A time units.

In the preferred embodiment, registration of a character string as a domain name in State-Type P Two provides that the registered domain name may be deleted from the registry's database of registered domain names and may then be registered by the same or a different registrant upon the occurrence of a request to register the identical character string under State-Type P One. In the preferred embodiment, the domain name registered in State-Type P Two allows the registrant to control all parameters which are available to the domain name in the TLD, such as without limitation the DNS settings for the domain name, the WHOIS contact information for the domain name, whether it is on "registrar lock," and similar. In this preferred embodiment, the registry charges a fee of X minus Y for a registration period of L time units and the registration-cancellation grace period is A plus B time units, where "X" is the standard fee for registering a domain name in the TLD, "Y" is an amount less than or equal to X, "A" is a unit of time and "B" is a unit of time which may be positive or negative.

In the preferred embodiment, registration of a character string as a domain name in State-Type P Three provides that the registered domain name may be deleted from the registry's database of registered domain names and may then be registered by the same or a different registrant, upon the occurrence of a request to register the identical character string under State-Type P One and/or under State-Type P Two. In this preferred embodiment, the domain name registered in State-Type Three limits the parameters which the registrant is allowed to control; the registrant is allowed to control all the parameters for the domain name except the DNS settings for the domain name which are controlled, instead, by the registry, by a registrar, or by a third party. Means to control the DNS settings for the domain name include those described above in paragraph [Para 17]. In this preferred embodiment, the registry charges a fee of X minus Z for a registration period of L time units and the registration-cancellation grace period is A plus C time units, where "X" is the standard fee for registering a domain name in the TLD in State-Type P One; "Y" is an amount less than or equal to X; "A" is a unit of time and "C" is a unit of time which may be positive or negative.

In an alternative embodiment of all of the disclosed embodiments, the various registration state-types may co-exist, though communication or utilization of the registration state-types and/or domain name parameters at any given time is determined by reference to other variables, including, for example and without limitation, the geographic location of the party requesting the IP address mapping of the domain name in question (as may be identified through the IP address of the party requesting the IP address or through various systems which may provide for self- or third-party reporting regarding the geographic location of the requesting party).

In an alternative embodiment of all of the disclosed embodiments, if a party in control of the domain name parameters receives funds or other forms of valuable consideration in exchange for licensing the use of the domain name parameters, then such party in control of the domain name parameters makes a payment of funds or another form of valuable consideration to at least one other party, which other party may include the party who registered the domain name. With respect to domain names in State-Type P Three in the preferred embodiment, if the party in control of the DNS settings for the domain name is a registry, the registry would make a payment to the registrant of the domain name and, as may or may not be required, to governmental and quasi-governmental bodies such as ICANN.

In an alternative embodiment of all of the disclosed embodiments, the date upon which fees, if any, charged by the registry and/or a registrar for such parties' services are due at a date other than prior to initiation of the services, such as, for example and without limitation, prior to expiration of the services.

In an alternative embodiment of all of the disclosed embodiments, if a party paid a fee to obtain registration services, and if the registration services are superseded by a subsequent domain name registration, then a refund of all or part of the fees is made, which may include a refund by the registrar, the registry, or by a payment made by the subsequent registrant to the prior registrant.

In an alternative embodiment of all of the disclosed embodiments, the registry system includes a sub-system which allows designers and operators of the registry system to identify and potentially avoid registration state-types and parameters which result in a registry system with internally inconsistent rules or behavior.

What is claimed is:

1. A computer system for registering domain names and/or IP addresses, the system consisting of a registry system which registers domain names and/or IP addresses in one or more registration state-type or -types and, when there is more than one registration state-type, in which certain of the registration state-type or -types have priority over other of the registration state-type or -types and in which domain names and/or IP addresses may be registered simultaneously in certain of the registration state-type or -types by the same or different parties;

which registry system includes means to identify which of the registration state-type or -types a request to register a domain name and/or IP address is directed to;

which registry system includes means to identify which of the registration state-type or -types a domain name and/or IP address is registered in;

which registry system includes:

a database of registered domain names and/or IP addresses;

means to process communications and instructions directed to the registry system and to return appropriate responses;

means to create and update a set of rules which define the one or more registration state-type or -types;

means to create and update a set of rules which define parameters associated with the one or more registration state-type or -types and the permissible values of such parameters;

means to optionally exchange consideration for registration services;

which registry system includes means to change the registration state-type or -types of existing domain name and/or IP address registrations;

which registry system includes means to set the values of the parameters associated with specific domain names and/or IP addresses registered in the registry system, including through delegation of authority.

2. The computer system according to claim 1, where the means to create and update a set of rules which define the one or more registration state-type or -types and the means to create and update a set of rules which define the value of the parameters associated with the one or more registration state-type or -types include means to:

identify potential combinations of registration state-type or -types and parameters;

identify conflicts produced by certain combinations of registration state-type or -types and parameters; and optionally prohibit the occurrence within any particular implementation of the registry system of selected combinations which produce conflicts.

3. The computer system according to claim 1, where the parameters associated with the one or more registration state-type or -types may consist of any of the following:

whether there are DNS settings for a registered domain name or routing instructions for an IP address, means to set the DNS settings or routing instructions, and means to delegate authority for who may set the DNS settings or routing instructions;

whether there is a request to register the same domain name and/or IP address in a registration state-type of equal or higher priority and means to upgrade or change the priority of the extant registration in response to such request;

whether a request or other command is received from the registrant or a third party to remove or downgrade the registration state-type or -types of a registered domain name and/or IP address, means to implement the request, and means to refund fees or other consideration, if any, paid for the removed or downgraded registration services;

whether control over a parameter has been assigned or licensed to a party other than the registrant and means to establish and exchange fees or other consideration between the party other than the registrant and another party which may include the registrant, based on such assignment or license;

whether fees are charged at the time of registration of a domain name or IP address or at a later date.

4. A method in a computer system for registering domain names and IP address, the method consisting of:

receiving at the computer system of claim 1 or claim 3 a request to register a domain name and/or IP address in one or more of the registration state-type or -types;

comparing the domain name and/or IP address to the database of registered domain names and/or IP addresses to determine if the received domain name and/or IP address is then currently registered;

where if the comparison determines that the requested domain name and/or IP address has not been registered, registering the domain name and/or IP address;

where if the comparison determines that the requested domain name and/or IP address is then currently registered, comparing the requested registration state-type or -types and the requested parameters to the then-extant registration state-type or -types and to the then-extant parameters;

determining, based on the comparison, whether or not the requested registration state-type or -types has or have priority over the then-extant registration state-type or -types.

5. The method according to claim 4 and the following iterative process:

where if the requested registration state-type or -types does not or do not have priority over the then-extant registration state-type or -types, then returning a message indicating that the requested domain name and/or IP address registration may not be registered;

where if the requested registration state-type or -types does or do have priority over the then-extant registration state-type or -types, then accessing the parameters of the then-extant registration state-type or -types to determine if the request to register the domain name and/or IP address in the requested registration state-type or -types is a value of one or more of such parameters;

where if the request to register the domain name and/or IP address in the requested registration state-type or -types is not a value of one or more of such parameters, then registering the domain names and/or IP address according to the registration request;

where if the request to register the domain name and/or IP address in the requested registration state-type or -types is a value of one or more of such parameters, then processing the rules established for such parameter(s) based on the value, and determining whether or not: as a result of processing the rules established for such parameters, the registration state-type or -types of the then-extant domain name and/or IP address registration has or have changed;

where if the registration state-type or -types of the then-extant registration has or have changed, then comparing the requested registration state-type or -types and the requested parameters to the then-extant registration state-type or -types and to the then-extant parameters;

determining, based on the comparison, whether or not the requested registration state-type or -types has or have priority over the then-extant registration state-type or -types and repeating the iterative process described in this claim 5 until the registry system returns a message indicating that the requested domain name and/or IP address registration may not be registered, until the registry system registers the domain name and/or IP address according to the registration request or until the system otherwise terminates the process of responding to the request to register the domain name and/or IP address.

* * * * *